(12) United States Patent
Griffith et al.

(10) Patent No.: US 7,656,053 B2
(45) Date of Patent: Feb. 2, 2010

(54) CONTROLLING POWER EXTRACTION FOR WIND POWER GENERATION

(75) Inventors: Saul Griffith, San Francisco, CA (US); Wensheng Hua, Fremont, CA (US); Corwin Hardham, San Francisco, CA (US); Peter Lynn, Alameda, CA (US); Jim McBride, San Francisco, CA (US)

(73) Assignee: Makani Power, Inc., Alameda, CA (US)

( * ) Notice: Subject to any disclaimer, the term of this patent is extended or adjusted under 35 U.S.C. 154(b) by 378 days.

(21) Appl. No.: 11/890,313

(22) Filed: Aug. 3, 2007

(65) Prior Publication Data
US 2009/0033098 A1    Feb. 5, 2009

(51) Int. Cl.
*F03D 9/00* (2006.01)
*B64C 31/06* (2006.01)

(52) U.S. Cl. .............................. 290/44; 290/55; 244/33; 244/153 R

(58) Field of Classification Search ................ 290/43, 290/44, 54, 55; 244/33, 153 R; 415/3.1
See application file for complete search history.

(56) References Cited

U.S. PATENT DOCUMENTS

| | | | |
|---|---|---|---|
| 3,987,987 A | 10/1976 | Payne et al. | |
| 4,124,182 A | 11/1978 | Loeb | |
| 4,285,481 A * | 8/1981 | Biscomb | 244/33 |
| 6,254,034 B1 * | 7/2001 | Carpenter | 244/153 R |
| 6,523,781 B2 * | 2/2003 | Ragner | 244/153 R |
| 7,188,808 B1 | 3/2007 | Olson | |
| 7,275,719 B2 | 10/2007 | Olson | |
| 7,504,741 B2 * | 3/2009 | Wrage et al. | 290/55 |
| 2007/0228738 A1 | 10/2007 | Wrage et al. | |
| 2009/0072092 A1 * | 3/2009 | Griffith et al. | 244/155 A |

OTHER PUBLICATIONS

Ockels et al. "Ship Propulsion by Kites Combining Energy Production by Laddermill Principle and Direct Kite Propulsion", Submitted for publication Kite Sailing Symposium, Sep. 28th-30th, 2006. Center for Wooden Boats/South Lake Union, Seattle, Washington.

M. Canale, L.Fagiano, M. Ippolito & M. Milanese; *Control of Tethered Airfoils for A New Class of Wind Energy Generator*; Decision and Control, 2006 45th IEEE Conference on Dec. 13-15, 2006; pp. 4020-4026, San Diego, CA USA.

* cited by examiner

*Primary Examiner*—Nicholas Ponomarenko
(74) *Attorney, Agent, or Firm*—Van Pelt, Yi & James LLP

(57) ABSTRACT

A power generation system is disclosed. The power generation system comprises a kite connected to a line. The line is alternatively let out during a traction phase and recovered during a recovery phase. A power extractor connected to the line to extract power during the traction phase. And, a power extraction controller configured to target a preferred traction phase line velocity and a preferred recovery phase line velocity.

36 Claims, 8 Drawing Sheets

CONTROLLING POWER EXTRACTION FOR WIND POWER GENERATION

BACKGROUND OF THE INVENTION

Power can be generated from wind using kites to pull out a line from a power extractor such as generator. However, eventually the line must be recovered and the kite pulled in. In order to have a net power gain, the power extracted from the line being pulled out needs to be greater than the energy expended in pulling the line back in. In addition, factors such as wind speed incident on the kite, line strength, and power extractor characteristics all influence how the power is extracted from the system and what a suitable operating point should be.

BRIEF DESCRIPTION OF THE DRAWINGS

Various embodiments of the invention are disclosed in the following detailed description and the accompanying drawings.

DETAILED DESCRIPTION

Figure 1:
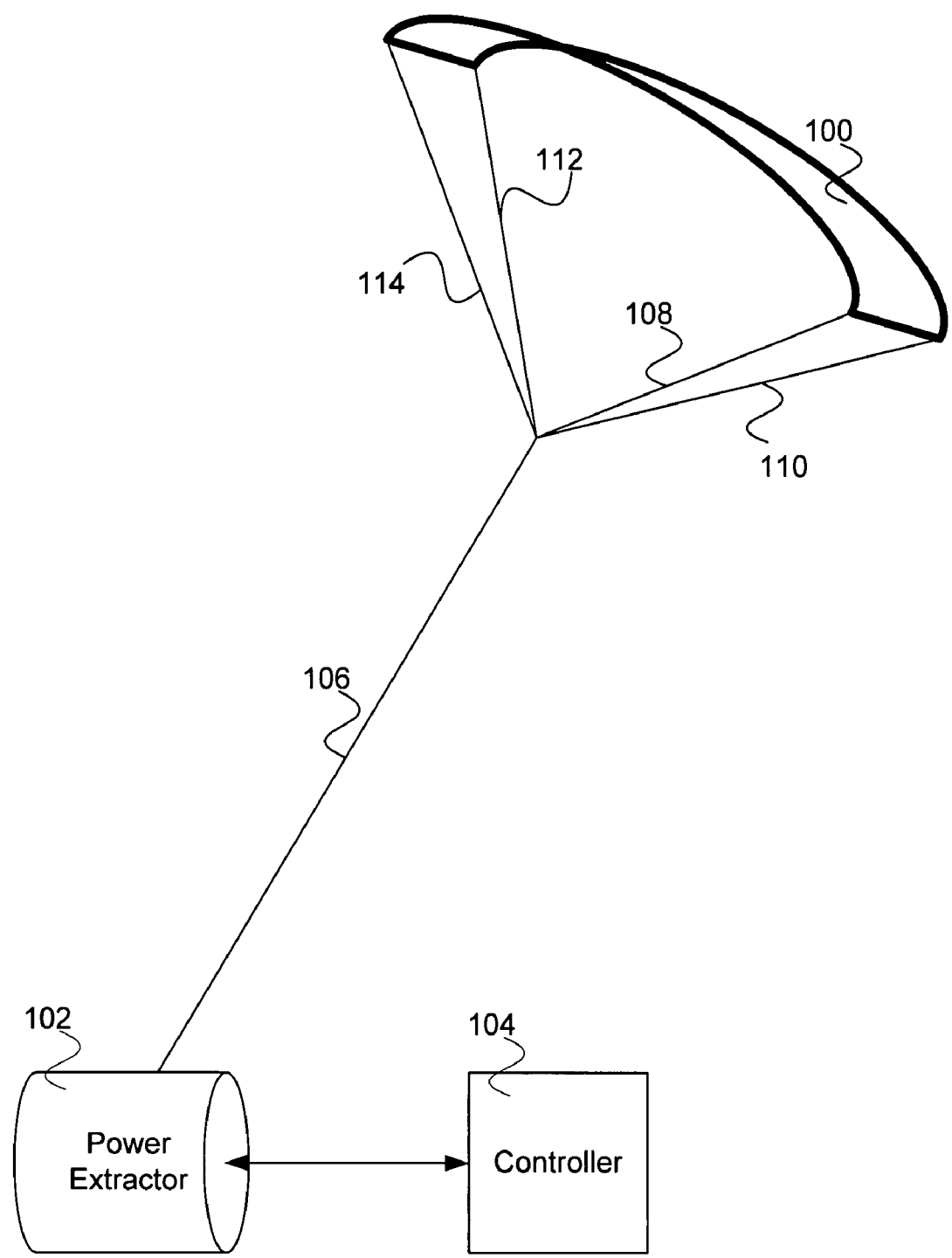
FIG. 1 is a block diagram illustrating an embodiment of a wind power generation system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling power extraction for wind power generation is disclosed. A kite power generation system generates power using a power extractor that is coupled to a line which is also coupled to a kite. Power is extracted when the line is let out during a traction phase. The line is recovered during a recovery phase. A power extraction controller determines a velocity ratio of a preferred traction phase line velocity and a preferred recovery phase line velocity. The line velocity refers to a linear speed of a line at the connection point with a power extractor (e.g., a spool or spindle connected to a generator). The velocity ratio is based at least in part on a force ratio, where the force ratio is the ratio of the force on the kite during traction phase to the force on the kite during the recovery phase. The power extraction controller is configured to determine a suitable operating point based on sensor measurements (e.g., that enable the force ratio to be calculated as well as other factors) and on system constraints (e.g., power extractor characteristics such as efficient operating points, break down points, line force tolerances, line length availability, safety parameters, wind gusts, etc.).

In some embodiments, a desired average power generated (e.g., a maximum average power given a set of constraints such as on torque on generator and on input parameters such as wind speed) is achieved by calculating a target traction phase and recovery phase velocity for the kite.

FIG. 1 is a block diagram illustrating an embodiment of a wind power generation system. In the example shown, kite 100 is coupled to line 106 using bridal lines 108, 110, 112, and 114. Kite 100 comprises a structure designed to capture wind. In some embodiments, kite 100 is comprised of fabric produced (e.g., cut and sown) to achieve a desired shape upon being subjected to wind. In some embodiments, bridal lines 108, 110, 112, and 114 are involved in controlling kite 100. In some embodiments, controls (not shown in FIG. 1) for controlling bridal line lengths are used for controlling kite 100. In some embodiments, changing the attachment point of line 106 to kite 100 is sufficient for controlling kite 100.

Line 106 is coupled to power extractor 102. In some embodiments, power extractor 102 comprises a spool for winding line 106 coupled directly or indirectly (e.g., using one or more gears or other mechanical converters and/or couplers) to an electric generator. In various embodiments, power extractor 102 extracts power using water pumping, air compression, or any other manner of converting a mechanical force into energy.

Controller 104 provides indications to power extractor of a suitable operating point. Indications are based on information from power extractor 102 (e.g., angular velocity of spool, gears, etc. and generated power) and other sensors (e.g., cameras, radar, LIDAR, wind sensors, pressure sensors, line strain sensors, inertial sensors, position sensors, anemometer, etc. not shown in FIG. 1). Indications are also based on information such as constraints or properties of system components. Constraints include a maximum angular spool velocity, a maximum line force, a minimum/maximum line length, a minimum/maximum line angle, etc. Properties include efficient spool velocity range for power generation, torque control force range for spool, etc. In various embodiments, constraints may also include economic constraints for components, power generation pricing, or any other factor affecting power generation levels or performance.

Figure 2:
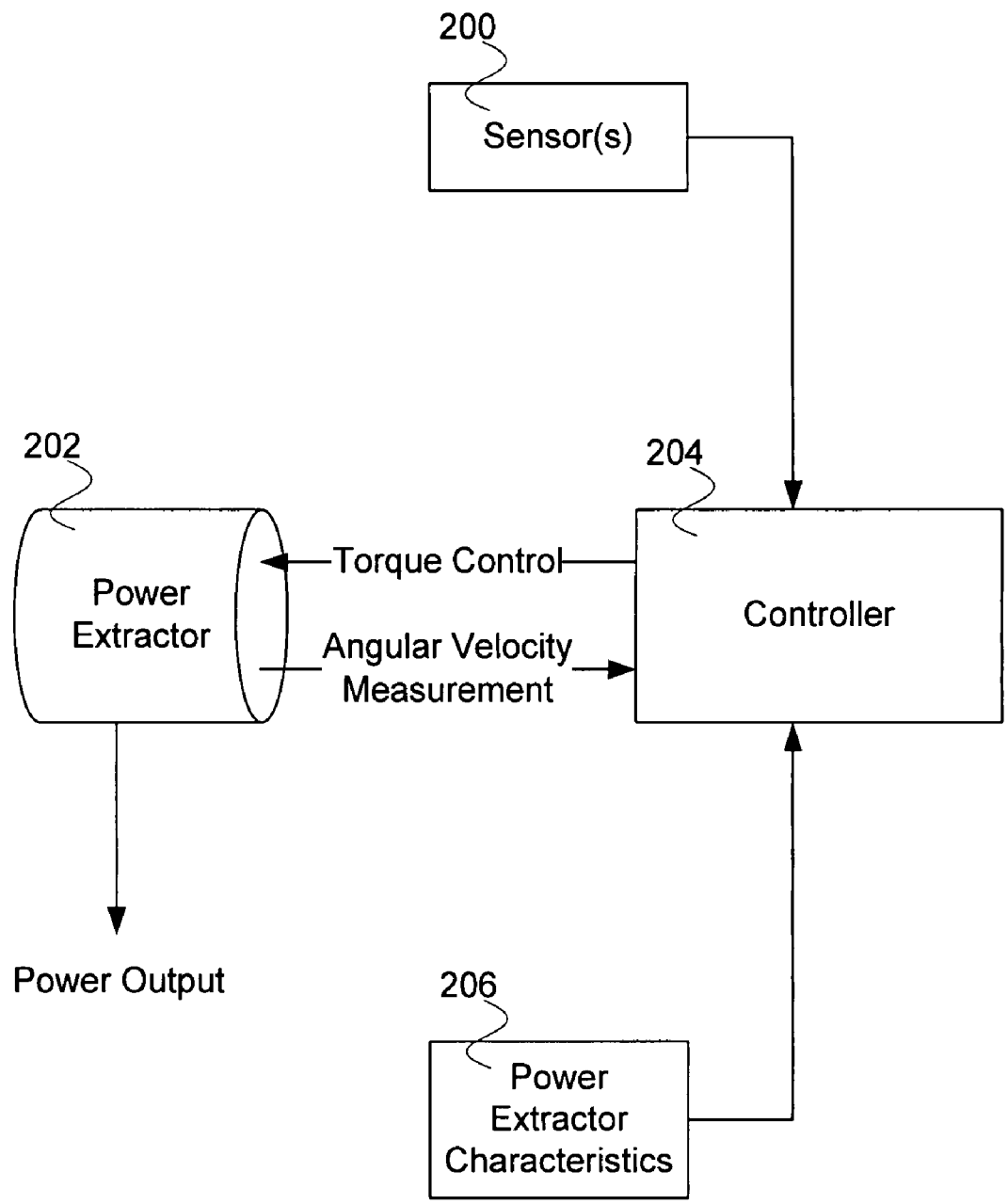
FIG. 2 is a block diagram illustrating an embodiment of a wind power generation system.

FIG. 2 is a block diagram illustrating an embodiment of a wind power generation system. In the example shown, power extractor 202 produces output power and is controlled using controller 204. Control is performed by indicating a torque to power extractor 202 to achieve a desired velocity (either in or out for a line attached to a kite) by achieving a desired angular velocity of a spool for the line. Controller 204 receives information from sensor(s) 200. Sensor(s) 200 provide information regarding the wind power generation system. For example, information regarding: the line attached to the kite such as a kite position, a line tension or force, a line length; the kite angle to the line, the bridal line lengths, the air pressure on windward and leeward sides of the kite, the kite altitude, the air temperature near the kite, the wind velocity, the wind direction, the kite global position; or any other appropriate information. In various embodiments, sensors comprise a camera, a radar, a LIDAR, a sonar, a strain gauge, a pitot tube, a pressure sensor, an inertial measurement unit, an anemometer, a wind sock, a global positioning sensor, a location sensor, or any other appropriate sensor.

In some embodiments, controller 204 maintains a nominal retarding torque at all times in order to maintain line tension. The kite may, at times, overcome the retarding torque during the traction portion of the cycle. When the speed of the kite nears the desired speed as determined by external inputs (e.g., sensor inputs), the torque is increased to maintain a desired speed.

Controller 204 also receives information such as power extractor characteristics 206. For example, range of velocities for power generation, maximum torque that can be applied to line, maximum velocity for spool, maximum change in velocity over a short period of time (e.g., a wind gust), etc. Controller 204 uses inputs (e.g., sensor information) to indicate to power extractor 202 a line velocity for traction phase (i.e., letting the kite out) and a line velocity for recovery phase (i.e., bringing the kite in). In some embodiments, controller 204 specifies a velocity ratio of the line velocity during traction and recovery phases. In some embodiments, controller 204 uses input information to calculate a force ratio. For example, a line force during both a traction and recovery phase can be determined using a strain gauge and be used to calculate a force ratio (e.g., a force ration corresponding to 1/a, where 'a' is a factor that comprises the ratio of the force on the line during the traction phase to the force on the line during the recovery phase).

In various embodiments, controller 204 uses measurements, calculations, or control of the system parameters of work, force, distance, torque, time, and/or velocity to optimize power generation of the system.

In some embodiments, controller 204 uses a pre-calculated ratio of line velocities (in and out) calculated for a given site (wind velocities, kite type). A mechanical system could be used to implement the control system for this site, where the system always operates close to this pre-calculated optimal ratio. For example, the mechanical system limits the line velocities to the pre-calculated ratio of line velocities or to a particular line velocity in and another particular line velocity out by gearing or mechanical breaking so that the system operates near a suitable operating point.

In various embodiments, controller 204 is configured to target a preferred traction phase line velocity and/or a preferred recovery phase line velocity, or a ratio of a traction phase line velocity to a recovery phase line velocity.

Figure 3:
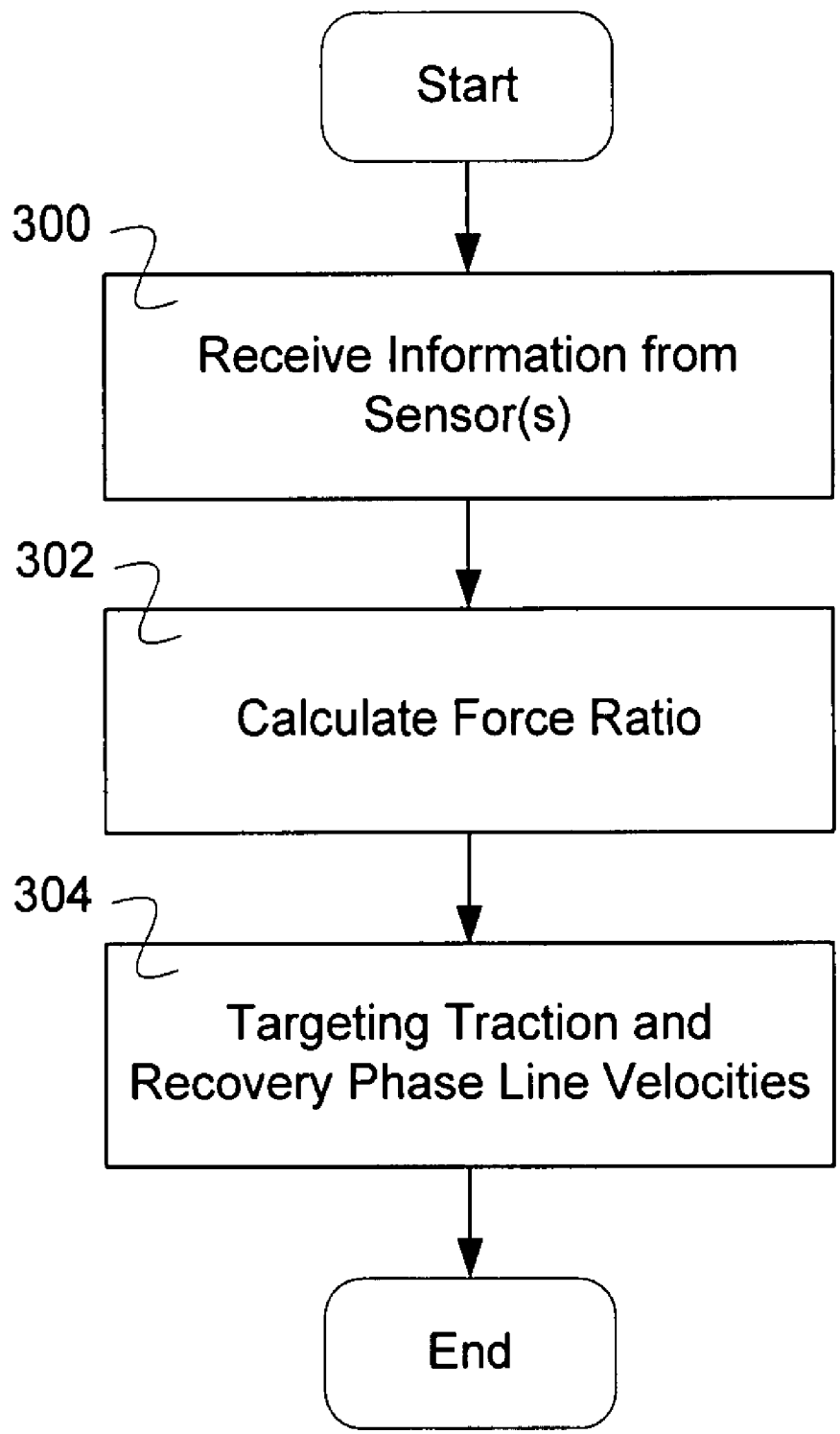
FIG. 3 is a flow diagram illustrating an embodiment of a process for determining a suitable operating point for a wind generating system.

FIG. 3 is a flow diagram illustrating an embodiment of a process for determining a suitable operating point for a wind generating system. In the example shown, in 300 information is received from sensor(s). In 302, a force ratio is calculated. In 304, a preferred traction and recovery phase line velocities are targeted. In some embodiments, a preferred traction phase line velocity and a preferred recovery phase line velocity are determined. In some embodiments, a ratio of traction and recovery phase line velocities is determined.

For a system that generates power in one phase (e.g., a traction phase) and consumes power during a second phase (e.g., a recovery phase), the average power generated by the system is:

$$P=(E_{out}-E_{in})/(T_{out}-T_{in}),$$

where $E_{out}$ is the energy generated in time $T_{out}$ and $E_{in}$ is the energy consumed in time $T_{in}$. For general kites the force parallel to the line that the kite exerts on the line is proportional to the square of the relative wind speed:

$$F_p = \alpha(w_p - v_p)^2,$$

where $w_p$ is the wind speed parallel to the line attached to the kite, $v_p$ is the velocity of the kite parallel to the line attached to the kite (positive $v_p$ is in the same direction—for the kite being let out from an anchor point such as the ground or winch attached to a generator—as $w_p$), and $\alpha$ is a proportionality constant. For a simple kite (e.g., kite flying but with little or no motion perpendicular to the line), the proportionality constant $\alpha = \frac{1}{2}\rho A C_L \cos(\text{theta})$, where $\rho$ is the air density, A is the area of the kite perpendicular to the wind, $C_L$ is the coefficient of lift for the kite, and theta is the angle between the wind direction and the direction of motion of the kite. For more complex kite situations (e.g., with perpendicular motion of the kite to the line anchoring the kite), the relationship between the force and the square of the relative velocity between the kite and the wind holds to first order but with a different proportionality constant.

For a kite which can change its configuration and reduce its force by a factor 'a' during the recovery phase, $\alpha_{out}$ and $\alpha_{in}$ will be different (where the subscript 'out' corresponds to the traction phase and the subscript 'in' corresponds to the recovery phase). This can be expressed as follows:

$$\alpha_{out} = \alpha$$

$$\alpha_{in} = \alpha/a.$$

In various embodiments, the configuration change is achieved by changing a kite shape, a kite angle of attack to the wind, the area presented to the wind (e.g., by opening flaps), and/or any other appropriate configuration change.

For a system where the kite line lets out for a distance D and in for the same distance D, the energy generated for the traction and recovery phases ($E_{out}$ and $E_{in}$, respectively) can be expressed as:

$$E_{in} = \alpha(1/a)(w_p + v_p^{in})^2 D$$

$$E_{out} = \alpha(w_p - v_p^{out})^2 D$$

The time spent moving the kite a distance D during the traction phase and recovery phase ($T_{out}$ and $T_{in}$, respectively) are given by:

$$T_{in} = D/v_p^{in}$$

$$T_{out} = D/v_p^{out}$$

The average net power 'P' is then given by:

$$P = \alpha((w_p - v_p^{out})^2 - (1/a)(w_p + v_p^{in})^2)/(1/v_p^{in} + 1/v_p^{out})$$

Figure 4A:
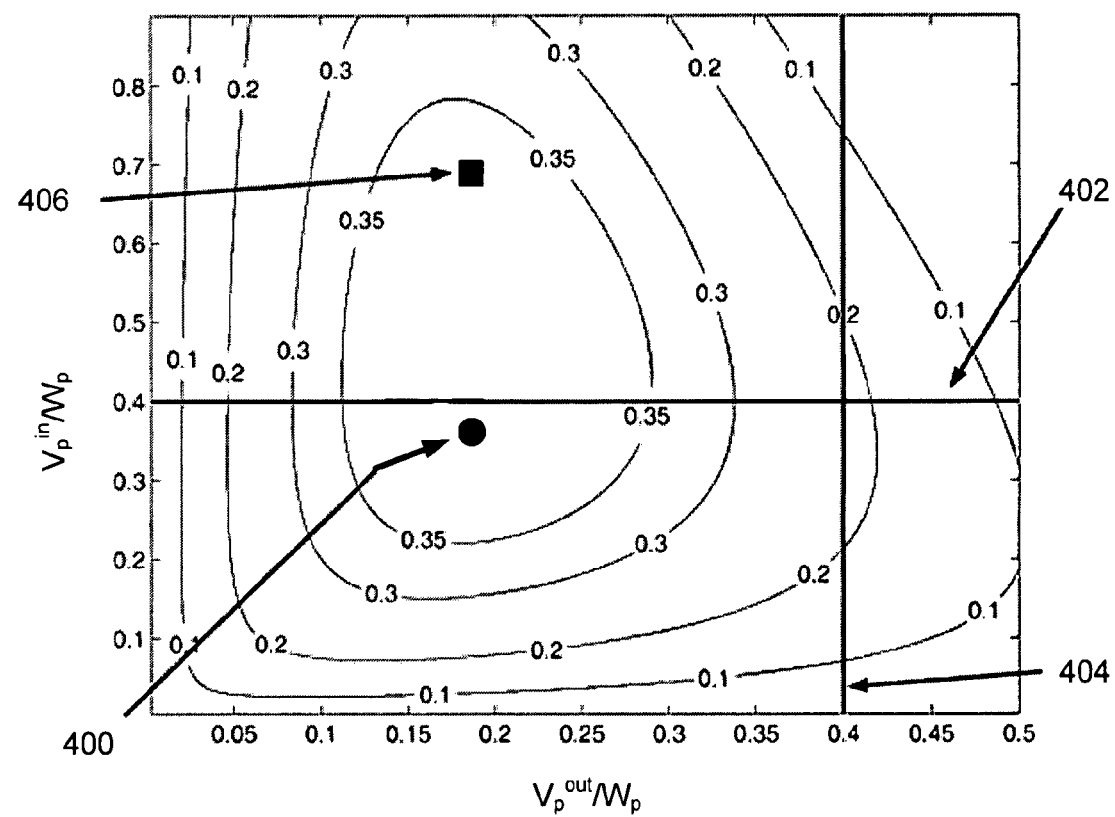
FIG. 4A is a graph illustrating net power as a function of $v_p^{in}$ and $v_p^{out}$ for an area reduction of 10 between the traction and recovery phases in one embodiment.

FIG. 4A is a graph illustrating net power as a function of $v_p^{in}$ and $v_p^{out}$ for an area reduction of 10 between the traction and recovery phases in one embodiment. In the example shown, the x-axis and y-axis correspond to $v_p^{in}$ and $v_p^{out}$ where both have been normalized by $w_p$. Note that there is a broad peak in the range of $0.25 \leq v_p^{in} \leq 0.75$ and $0.12 \leq v_p^{out} \leq 0.28$. A choice of a line velocity for the traction and recovery phases can be chosen within that range to optimize power output of a power extractor. However, a suitable operating point might be constrained by a maximum line velocity. So, for example, if the $w_p$ is such that a maximum line velocity constrains the $v_p^{out}$ (404) and $v_p^{in}$ (402) to 0.4, then a suitable operating point such as 400 can be selected, but not 406. In some cases, external factors may bias the operating point away from the broad peak. In these cases, more suitable operating points might be based on economic factors of system components, material limitations (line or kite), etc., and may be identified by trying a number of different force ratios (or equivalently a number of different force factors 'a').

Figure 4B:
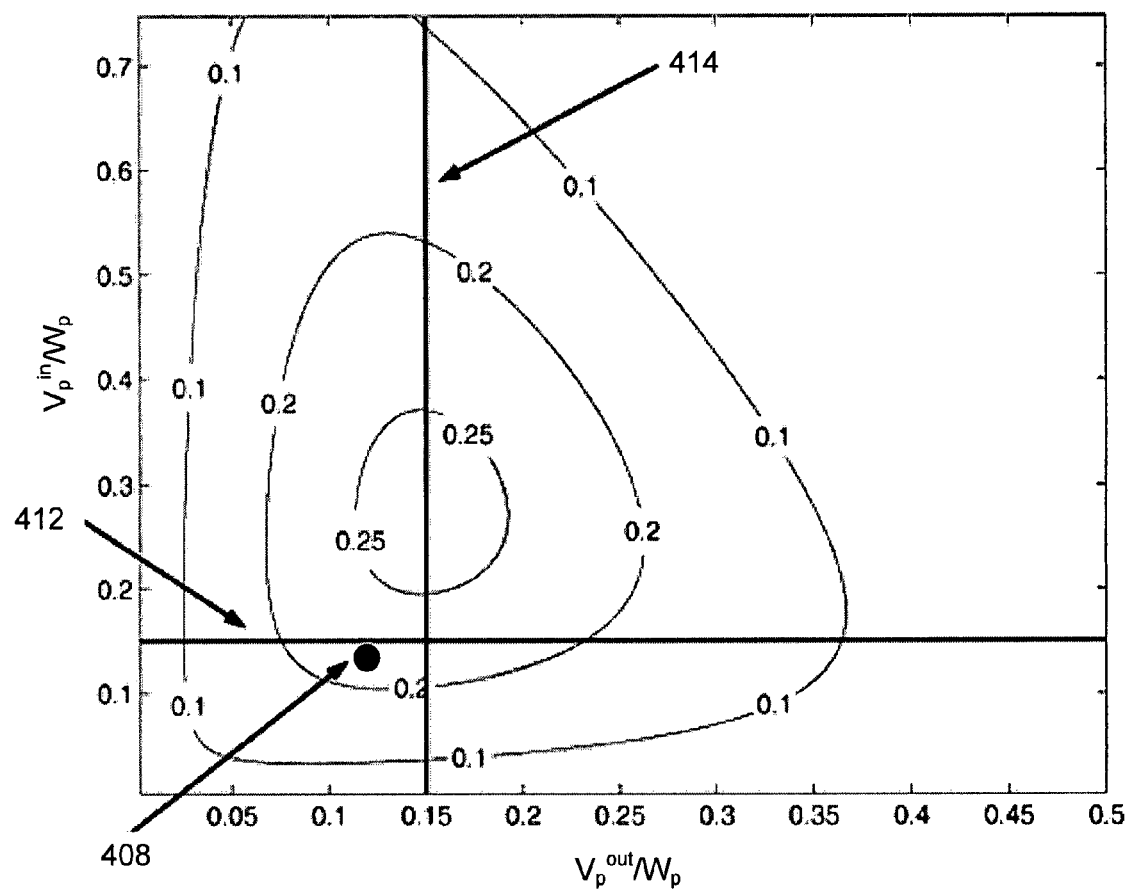
FIG. 4B is a graph illustrating net power as a function of $v_p^{in}$ and $v_p^{out}$ for an area reduction of 5 between the traction and recovery phases in one embodiment.

FIG. 4B is a graph illustrating net power as a function of $v_p^{in}$ and $v_p^{out}$ for an area reduction of 5 between the traction and recovery phases in one embodiment. In the example shown, the x-axis and y-axis correspond to $v_p^{in}$ and $v_p^{out}$ where both have been normalized for $w_p$. Note that there is a broad peak in the range of $0.2 \leq v_p^{in} \leq 0.4$ and $0.1 \leq v_p^{out} \leq 0.2$. A choice of a line velocity for the traction and recovery phases can be chosen within that range to optimize power output of a power extractor. However, a suitable operating point might be constrained by a maximum line velocity. So, for example, if the $w_p$ is such that a maximum line velocity constrains the $v_p^{out}$ (414) and $v_p^{in}$ (412) to 0.15, then a suitable operating point such as 408 can be selected. In this case, the operating point does not lie in the broad peak.

Figure 5:
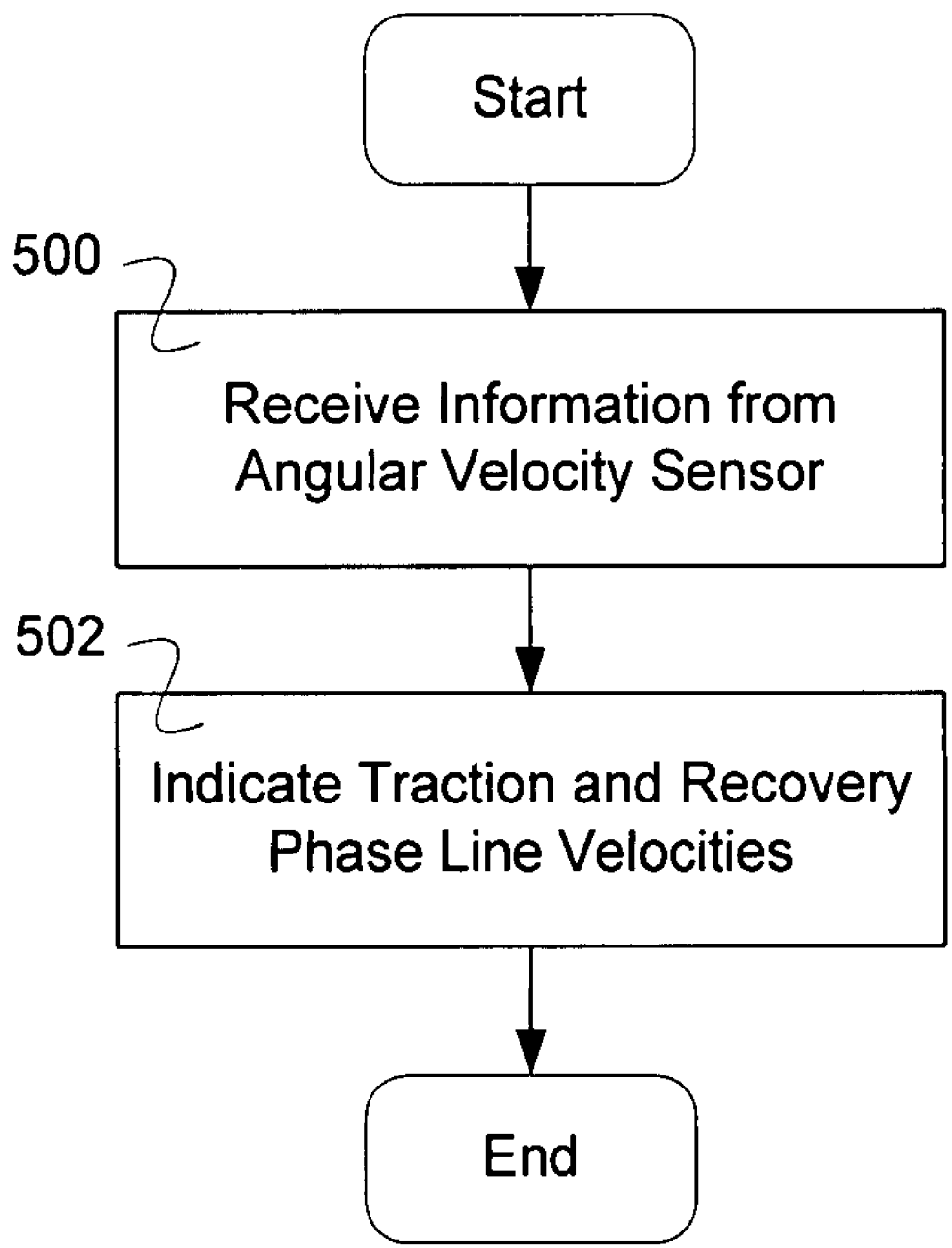
FIG. 5 is a flow diagram illustrating an embodiment of a process for controlling a wind generating system to operate at a suitable operating point.

FIG. 5 is a flow diagram illustrating an embodiment of a process for controlling a wind generating system to operate at a suitable operating point. In the example shown, in 500 information from an angular velocity sensor is received. The angular velocity provides information regarding the line velocity by measuring the spool velocity. In 502 a traction and recovery phase line velocity is indicated. The indication is used to control the spool angular velocity. The angular velocity is controlled using torque applied to the spool to achieve the desired line velocity.

Figure 6:
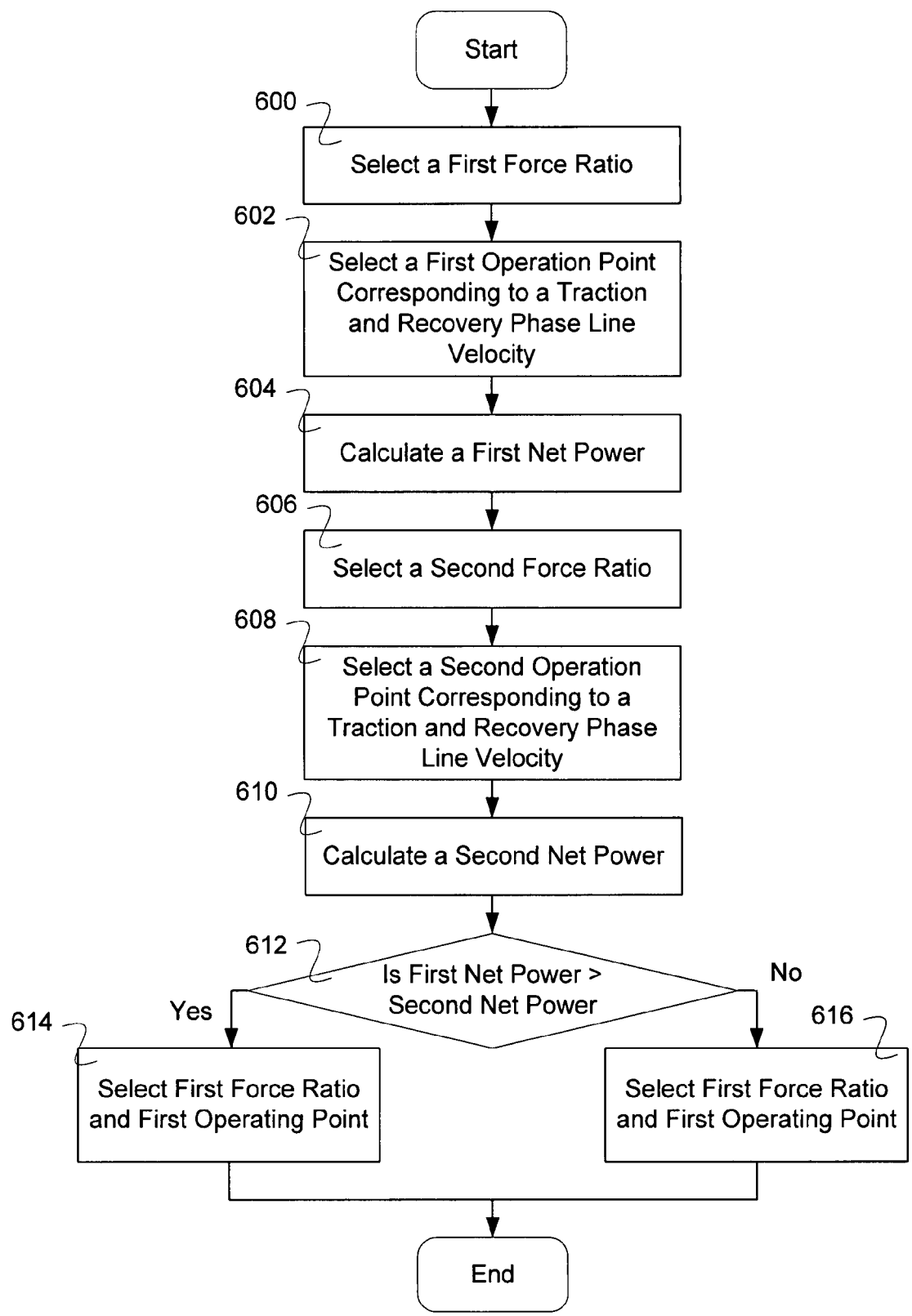
FIG. 6 is a flow diagram illustrating an embodiment of a process for selecting a suitable operating point.

FIG. 6 is a flow diagram illustrating an embodiment of a process for selecting a suitable operating point. In the example shown, in 600 a first force ratio is selected. In 602, a first operating point is selected corresponding to a traction and recovery phase line velocity. In 604, a first net power is calculated. In 606, a second force ratio is selected. In 608, a second operating point is selected corresponding to a traction and recovery phase line velocity. In 610, a second net power is calculated. In 612, it is determined if first net power is greater than second net power. If the first net power is greater, then in 614 the first force ratio and first operating point are selected. If the second net power is greater, than in 616 the second force ratio and second operating point are selected. The process can be repeated. In some embodiments, a more complex and/or more optimized search can be utilized to determine a force ration and operating point.

Figure 7:
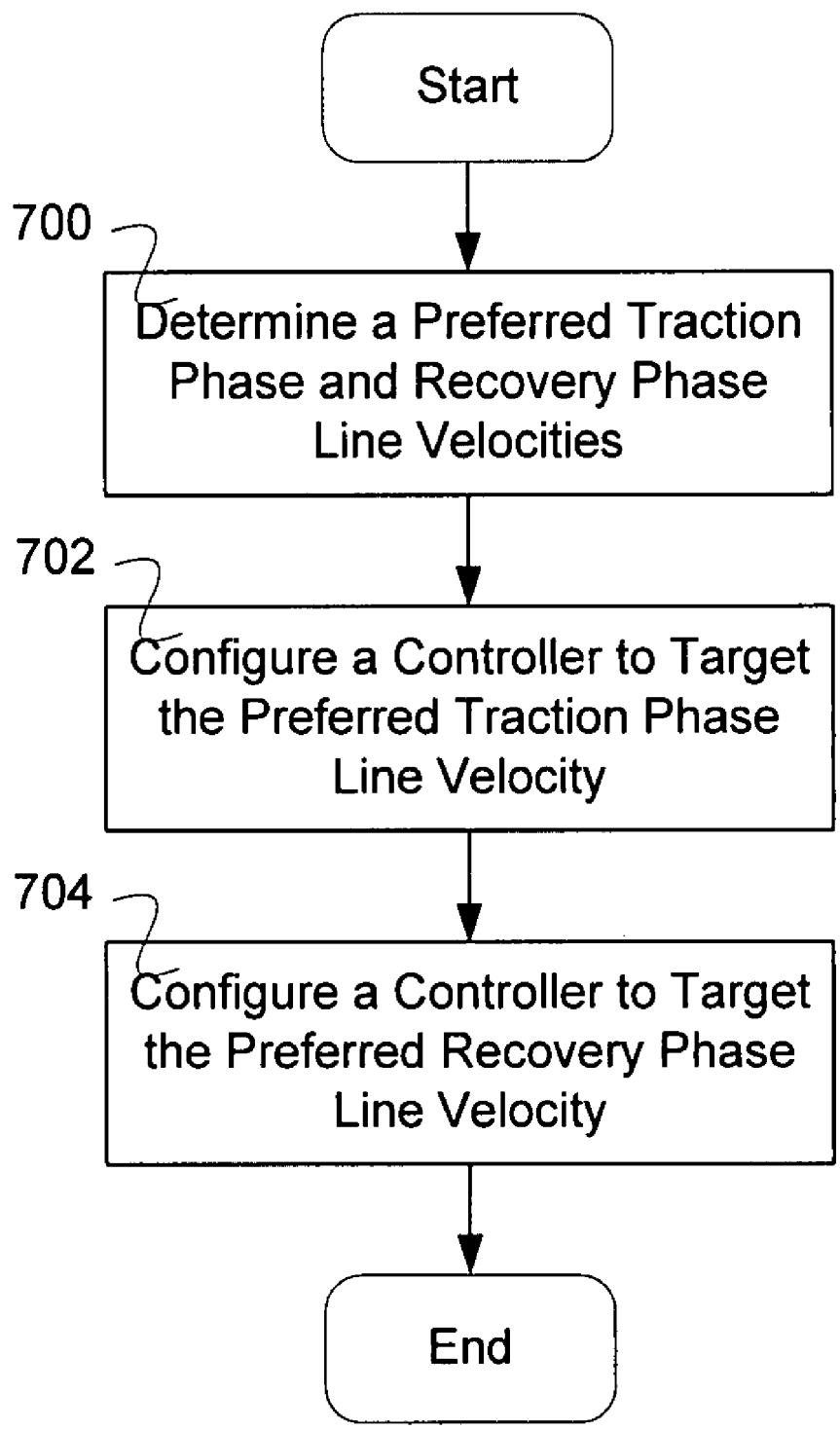
FIG. 7 is a flow diagram illustrating an embodiment of a process for power generation.

FIG. 7 is a flow diagram illustrating an embodiment of a process for power generation. In the example shown, in 700 a preferred traction phase line velocity and a preferred recovery phase line velocity are determined. In 702, a controller is configured to target the preferred traction phase line velocity. During the traction phase the line is let out, and power is extracted as the line is being let out. The line connected between a kite and a power extractor (e.g., a generator). In 704, a controller is configured to target the preferred recovery phase line velocity. During the recovery phase the line is recovered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power generation system comprising:
    a kite connected to a line wherein the line is alternatively let out during a traction phase and recovered during a recovery phase;
    a power extractor connected to the line to extract power during the traction phase;
    a power extraction controller configured to target a preferred traction phase line velocity and a preferred recovery phase line velocity.

2. A system as in claim 1, wherein the power extractor comprises an electric generator.

3. A system as in claim 1, wherein the power extraction controller is configured to determine a velocity ratio based at least in part on the preferred traction phase line velocity and the preferred recovery phase line velocity.

4. A system as in claim 3, wherein the velocity ratio is based at least in part on a force ratio.

5. A system as in claim 4, wherein the power extraction controller improves the force ratio to improve power extraction efficiency by changing the force ratio from a first ratio to a second ratio and measuring power extraction efficiency to determine whether the first ratio or the second ratio is more efficient for power extraction.

6. A system as in claim 1, wherein the power extraction controller is configured to determine the preferred traction phase line velocity based at least in part on a wind speed.

7. A system as in claim 1, wherein the power extraction controller is configured to determine the preferred recovery phase line velocity based at least in part on a wind speed.

8. A system as in claim 1, wherein the power extraction controller is configured to determine the preferred traction phase line velocity based at least in part on a line load.

9. A system as in claim 1, wherein the power extraction controller is configured to determine the preferred recovery phase line velocity based at least in part on a line load.

10. A system as in claim 1, wherein the power extraction controller is configured to determine the preferred traction phase line velocity based at least in part on one or more of the following: a line length, a kite angle to a line, a kite position, an image captured by a camera, a radar, a pressure sensor, a location sensor, or a global positioning sensor.

11. A system as in claim 1, wherein the power extraction controller is configured to determine the preferred recovery phase line velocity based at least in part on one or more of the following: a line length, a kite angle to a line, a kite position, an image captured by a camera, a radar, a pressure sensor, a location sensor, or a global positioning sensor.

12. A system as in claim 1, wherein the power extraction controller is configured to determine the preferred traction phase line velocity based at least in part on a constraint due to the power extractor.

13. A system as in claim 1, wherein the power extraction controller is configured to determine the preferred recovery phase line velocity based at least in part on a constraint due to the power extractor.

14. A system as in claim 1, wherein the power extraction controller is configured to determine the preferred traction phase line velocity based at least in part on a constraint due to a force limit.

15. A system as in claim 1, wherein the power extraction controller is configured to determine the preferred recovery phase line velocity based at least in part on a constraint due to a force limit.

16. A system as in claim 1, wherein the power extraction controller is configured to determine a traction phase line velocity near a turn around based at least in part on a constraint due to a line length.

17. A system as in claim 1, wherein the power extraction controller is configured to determine a recovery phase line velocity near a turn around based at least in part on a constraint due to a line length.

18. A system as in claim 1, wherein the power extraction controller is configured to maintain a tension on the line by applying a retarding torque during the traction phase.

19. A method for power generation comprising:
determining a preferred traction phase line velocity and a preferred recovery phase line velocity;
configuring a controller to target the preferred traction phase line velocity for a line connected to a kite during a traction phase, wherein during the traction phase the line is let out and power is extracted as the line is being let out; and
configuring a controller to target the preferred recovery phase line velocity a line connected to the kite during a recovery phase, wherein during the recovery phase the line is recovered.

20. A method as in claim 19, wherein power is extracted using an electric generator.

21. A method as in claim 19, wherein a velocity ratio is determined based at least in part on the preferred traction phase line velocity and the preferred recovery phase line velocity.

22. A method as in claim 21, wherein the velocity ratio is based at least in part on a force ratio.

23. A method as in claim 22, wherein the controller improves power extraction efficiency by changing the force ratio from a first ratio to a second ratio and measuring power extraction efficiency to determine whether the first ratio or the second ratio is more efficient for power extraction.

24. A method as in claim 19, wherein the preferred traction phase line velocity is based at least in part on a wind speed.

25. A method as in claim 19, wherein the preferred recovery phase line velocity is based at least in part on a wind speed.

26. A method as in claim 19, wherein the preferred traction phase line velocity is based at least in part on a line load.

27. A method as in claim 19, wherein the preferred recovery phase line velocity is based at least in part on a line load.

28. A method as in claim 19, wherein the preferred traction phase line velocity is based at least in part on one or more of the following: a line length, a kite angle to a line, a kite position, an image captured by a camera, a radar, a pressure sensor, a location sensor, or a global positioning sensor.

29. A method as in claim 19, wherein the preferred recovery phase line velocity is based at least in part on one or more of the following: a line length, a kite angle to a line, a kite position, an image captured by a camera, a radar, a pressure sensor, a location sensor, or a global positioning sensor.

30. A method as in claim 19, wherein the preferred traction phase line velocity is based at least in part on a power extractor constraint.

31. A method as in claim 19, wherein the preferred recovery phase line velocity is based at least in part on a power extractor constraint.

32. A method as in claim 19, wherein the preferred traction phase line velocity is based at least in part on a force limit constraint.

33. A method as in claim 19, wherein the preferred recovery phase line velocity is based at least in part on a force limit constraint.

34. A method as in claim 19, further comprising determining a traction phase line velocity near a turn around that is based at least in part on a line length.

35. A method as in claim 19, further comprising determining a recovery phase line velocity near a turn around that is based at least in part on a line length.

36. A computer program product for power generation, the computer program product being embodied in a computer readable medium and comprising computer instructions for:
determining a preferred traction phase line velocity and a preferred recovery phase line velocity;
configuring a controller to target the preferred traction phase line velocity for a line connected to a kite during a traction phase, wherein during the traction phase the line is let out and power is extracted as the line is being let out; and
configuring a controller to target the preferred recovery phase line velocity a line connected to the kite during a recovery phase, wherein during the recovery phase the line is recovered.

\* \* \* \* \*